June 17, 1941.                M. P. BLOMBERG                    2,246,340
                            RAILWAY BRAKE RIGGING
                           Filed June 12, 1939          2 Sheets-Sheet 1
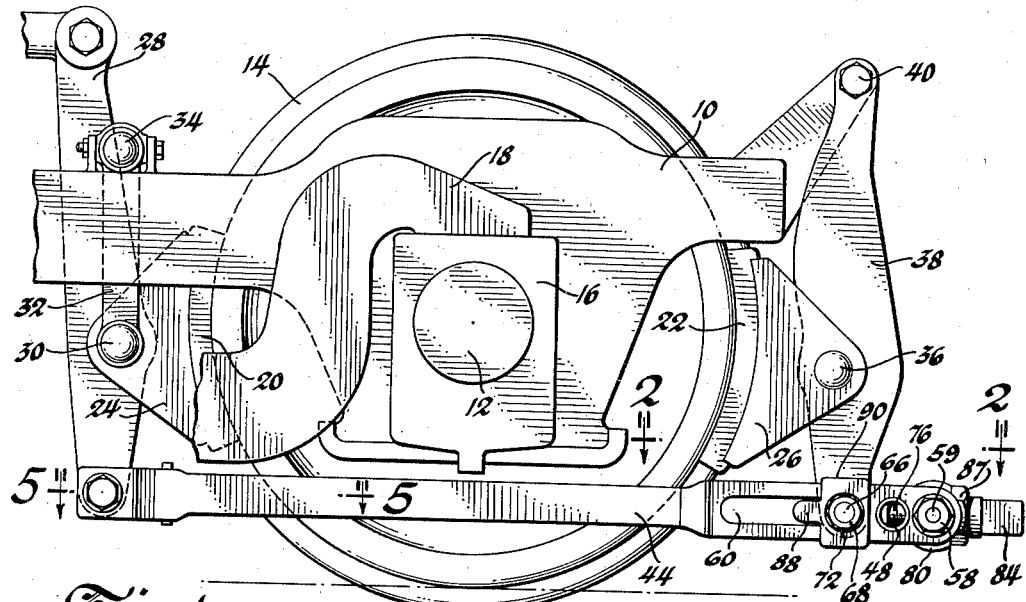
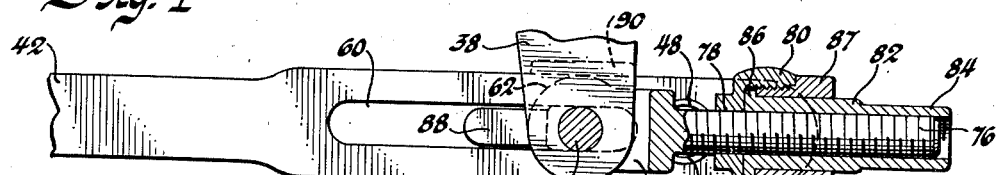
Inventor
Martin P. Blomberg
By
Attorneys Inventor
Martin P. Blomberg Patented June 17, 1941

2,246,340

UNITED STATES PATENT OFFICE 2,246,340

RAILWAY BRAKE RIGGING

Martin P. Blomberg, Hinsdale, Ill., assignor to General Motors Corporation, Detroit, Mich., a corporation of Delaware Application June 12, 1939, Serial No. 278,719

6 Claims. (Cl. 188—197)

This invention relates to improvements in brake rigging for railway vehicles, and has for its object the provision of such a construction which will be simpler and lighter in weight than those which have preceded it, and which therefore will be more economical to produce.

Another object of the invention is to devise the rigging so that it may be easily taken apart and put back together again, whenever repairs or replacement of parts is necessary, regardless of how long it has been in service.

Other objects and advantages of the construction will be apparent upon reference to the specification and accompanying drawings, in which—

Fig. 1 is a side view of a portion of a railway vehicle truck showing one of the wheels and my improved brake rigging associated therewith.

Fig. 2 is an enlarged sectional view, taken on the line 2—2 of Fig. 1.

Fig. 3 is a sectional view, taken on the line 3—3 of Fig. 2.

Figure 4:
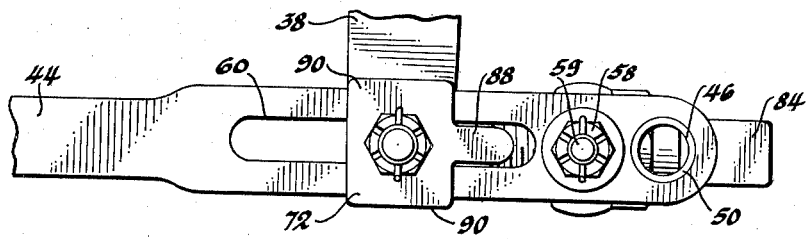
Fig. 4 is an enlarged view of a portion of the construction shown in Fig. 1, showing the parts assembled in a different relation to each other.
Figure 5:
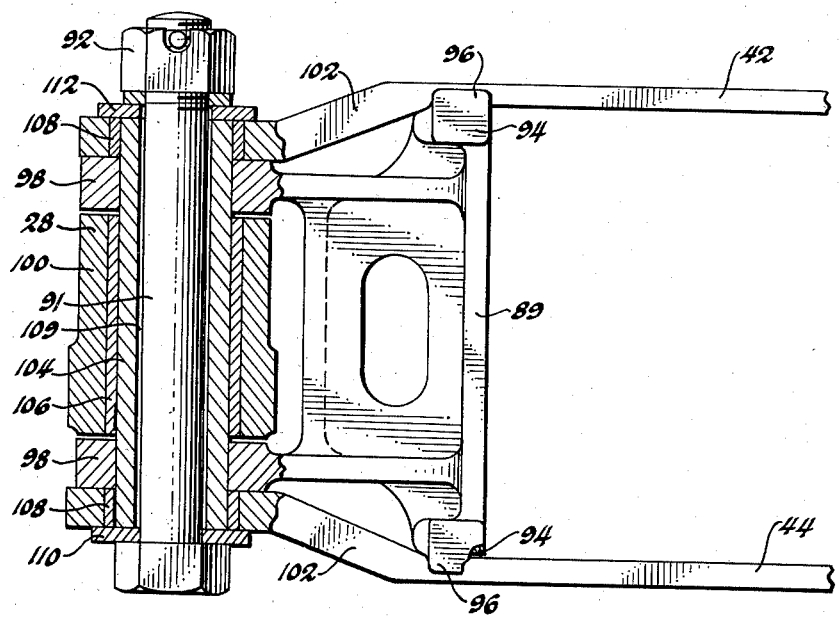
Fig. 5 is an enlarged sectional view, taken on the line 5—5 of Fig. 1.
Figure 6:
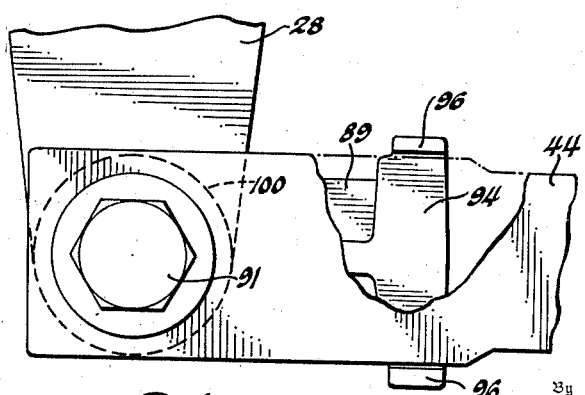
Fig. 6 is a side elevational view of the structure shown in Fig. 5.

The reference numeral 10 indicates the frame of a railway vehicle truck, in which the axle 12 carrying the wheels 14 is journalled in the usual manner in journal boxes 16, and 18 is an equalizer bar, the ends of which rest on top of the journal boxes. The brake arrangement shown is of the well-known clasp type, and consists of brake shoes 20 and 22 adapted to be forced against the opposite sides of the wheel, the shoes being supported upon brake heads 24 and 26. The brake head 24 is pivotally connected to a live truck lever 28 at 30, and is supported by a pair of hangers 32 which are pivotally secured to the truck frame at 34, while the brake head 26 is pivotally connected at 36 to a dead truck lever 38, which is pivotally supported at 40 on the truck frame. The lower ends of the levers 28 and 38 are connected together by a pair of tension rods 42 and 44 which extend on opposite sides of the wheel, the connection between these rods and the lever 38 being best shown in Figs. 2 to 4, while the connection between the rods and the lever 28 is best shown in Figs. 5 and 6.

Referring particularly to Figs. 2 and 3, it will be seen that at the right hand end of each of the tension rods 42 and 44, there are two holes 46 and 48 provided, bushings 50 being pressed into these holes. The tension rods are spaced apart and held in proper position with respect to each other by a trunnion member 52 having trunnion portions 54 formed on each end thereof, which portions are adapted to fit within the bushings in the holes 46 or 48. When the brake rigging is first assembled with new brake shoes, the trunnion portions are located in the holes 46, as shown in Figs. 2 and 3, and the tension rods are clamped against shoulders 56 on the member 52 by nuts 58 which are threaded onto extensions 59 formed on the ends of trunnion portions 54.

Formed in the right hand ends of each of the tension rods adjacent to the holes 48 are elongated slots 60, the rods being made wider and thicker at the point where the slots are formed to compensate for the material removed in making the slots. A fulcrum block 62 is located between the tension rods and has a centrally located slot 64 formed in it, in which fits the lower end of the dead truck lever 38, the latter being pivotally connected to the fulcrum block by a bolt 66 which extends through the slots 60 in the tension rods, and which is held in place by a nut 68 threaded on the end of the bolt, there being plates 70 and 72 provided between the head of the bolt and the rod 42, and between the nut and the rod 44. A compression spring 74 is interposed between the nut 68 and the washer 72 to maintain the parts under the proper tension to permit movement of them relative to the tension rods but to prevent rattling thereof.

The fulcrum block 62 has formed on it, or secured to it in any suitable manner, a screw 76 which extends through a hole 78 formed in the central portion of the member 52, the latter being enlarged as at 80 at this portion. Mounted on the screw in threaded engagement therewith is a nut 82 having a non-circular shaped portion 84 formed on its outer end, and a circular flange 86 formed on its inner end. This nut is held in the enlarged central portion of the member 52 by a sleeve 87 which is threaded into the member 52 and which engages the flange 86 to prevent longitudinal movement of the nut with respect to the member 52, the nut of course being free to rotate in the member 52, and when so rotated causing the screw to move longitudinally with respect to the member 52, thereby changing the position of the fulcrum block and the lever 38 to be changed with respect to the tension rods 42 and 44. The plates 70 and 72 each have formed on them a projection 88 which fits into the slot 60, for a purpose to be described later, and flanges 90 provided at the top and bottom portions of the plate extend over the upper and lower edges of the tension rods 42 and 44.

Referring to Figs. 5 and 6, the opposite ends of the tension rods are held in proper spaced relation to each other by means of a bridging member 89 and a bolt 91 and nut 92, the latter being threaded onto the bolt. At the end adjacent the wheel 14, the bridging member is made relatively wide by having projections 94 formed on it, against which projections the tension rods bear, there being flanges 96 formed on the top and bottom portions of the projections, which flanges extend over the upper and lower edges of the tension rods to hold the bridging member in proper relation to the rods. At its opposite end, the bridging member has spaced apart lugs 98 formed on it, and a boss 100 formed integral with or secured to the lower end of the live truck lever 28 is received in the space between the lugs 98. It will be seen from Fig. 5 that since the outer faces of the lugs 98 are closer together than are the faces of the projections 94, the tension rods are offset as at 102 to permit them to bear against the lugs. The purpose of this is to allow the use of as short a bolt as possible to obtain clearance between it and adjacent parts, and to decrease the weight since these bolts are quite large and are therefore relatively heavy, and to lower the expense since these bolts are specially machined and their cost is in proportion to their size.

If conventional practice had been followed in designing this construction, the holes in the tension rods, the lugs and the boss through which the bolt 91 extends would have been made only slightly larger in diameter than the diameter of the body portion of the bolt, in order that there might be as little play or lost motion between the parts as possible. While such a construction is satisfactory when new, the brake rigging must be taken apart and put back together again several times during its life, and it has been found that after it has been in service for a time, the bolts used to hold the tension rods in place become so corroded that it is only with great difficulty that they may be removed from the parts they pass through, it very frequently being necessary to drive them out with a sledge hammer. This is objectionable since it increases greatly the labor cost of disassembling the brake rigging, and also because quite often the ends of the bolts are so damaged by the hammering upon them that they cannot be used again, and must be replaced, and as pointed out above, being specially machined they are quite expensive so this is a serious objection.

Therefore, instead of having the bolt 91 fit directly into the parts it passes through, I form larger holes in the tension rods, the lugs 98 and the boss 100, and provide a sleeve 104 which extends through these holes and terminates substantially flush with the outer faces of the tension rods at the point where the bolt 91 passes through the rods. The diameter of the holes in the lugs 98 is made substantially the same as the outside diameter of the sleeve, so that the latter is a light press fit in the lugs. A bushing 106 pressed into the boss 100 has its inside diameter slightly larger than the outer diameter of the sleeve so that the lever 28 may be free to rotate with respect to the sleeve, while bushings 108 pressed into the holes in the rods 42 and 44 have their inside diameters enough larger than the outer diameter of the sleeve to permit easy assembly upon or removal from the latter. The diameter of the hole in the sleeve is enough larger than the diameter of the body portion of the bolt to insure that there will be a substantial clearance 109 between the bolt and the sleeve at all times to permit easy removal of the bolt from within the sleeve. In other words, the clearance is such that even if the bolt should become badly corroded, it still could be knocked out of the hole in the sleeve without requiring any heavy hammering upon it which might damage it. A washer 110 is placed between the head of the bolt and the rod 44, while another washer 112 is placed between the nut 92 and the rod 42. When the nut is tightened, the washers are drawn against the faces of the rods 42 and 44 thereby firmly holding the bolt in position in the sleeve so that there can be relative movement between the two in spite of the substantial clearance between them, and since the tension rods, the lugs 98 or the boss 100 cannot move relative to the sleeve because of the small clearance between them and the sleeve, there can be no play or lost motion between any of the parts, and therefore no vibration or rattling noises can develop at this point, while at the same time the parts may be easily disassembled regardless of how long they have been in service.

The operation of the slack adjusting part of the structure is as follows. As previously stated, when the brake rigging is first assembled with new brake shoes, the trunnion portions on the member 52 are placed in the holes 46 in the tension rods, and the plates 70 and 72 are assembled in the position shown in Figs. 2 and 3, so that the projections 88 which fit within the slots 60 extend toward the end of the slots nearest to the wheel. As the brake shoes become worn, the nut 82 is rotated by applying a wrench to the end 84, and this causes the screw 76 and fulcrum block 62 to be moved toward the wheel, and since the brake lever 38 is connected to the fulcrum block, the brake shoes are moved closer to the wheel to compensate for the wear which has taken place.

If the screw 76 were made long enough to take care of the entire range of adjustment of the brake shoes with the parts in one position, it would necessarily be quite long and therefore would increase unduly the weight and cost of the brake rigging. I have found that by devising the structure so that the total range of adjustment is made in two steps instead of in one, the screw may be made shorter, thereby reducing the weight and cost of the structure. This is accomplished by so proportioning the parts that when the screw has been advanced toward the wheel as far as it may safely go, the projection 88 will engage the end of the slot 60 nearest to the wheel, thereby preventing any further movement of the screw. When this occurs, the nut 82 is rotated in the reverse direction back to its original position when the brake shoes were new, and the nuts 58 and 66 are removed to permit the tension rods to be slipped off of the trunnions 54, after which the latter are inserted into the holes 48 in the tension rods and the plates 70 and 72 are swung around 180 degrees so that the projections 88 fit into the slots 60 in a position extending away from the wheel, as shown in Fig. 4, after which the nuts 58 are again screwed onto the projections 59 to hold the assembly together. The reason for reversing the position of the projections 88 on the plates 70 and 72 is that when the trunnions are placed in the holes 48, all of the slack adjuster parts are of course moved toward the wheel and therefore closer to the ends of the slots 60 which are adjacent to the wheel, and in this position it is not desired to have the projections 88 engage the end of the slot, as such engagement would prevent the full range of permissible movement of the adjusting screw 76. Therefore the projections 88 are put in the position shown in Fig. 4, in which position they do not limit the advancing movement of the adjusting screw.

It will be seen from the above that while the full range of adjustment of the brake shoes is maintained, the screw 76 may be made considerably shorter than is usually the case, and therefore the weight and cost of building the structure may be reduced. Also, by providing the extra holes 48 in the tension rods at the slack adjuster end of the rods rather than at the other end, as is usually done, the task of readjusting the position of the tension rods to take up excessive slack is greatly simplified, since the slack adjuster end of the rigging is at the outside of the truck where it is readily accessible, whereas the opposite end is on the inside of the truck and very often adjacent parts such as the traction motor housings and other parts are in the way, making it very difficult to get at the brake rigging.

While I have shown and described a specific embodiment of my invention, it will be understood that various changes in the details of the structure may be made without departing from the spirit and scope of the appended claims.

I claim:

1. In a brake rigging, the combination of a pair of tension rods each of which has an elongated slot and a hole formed therein adjacent one end thereof, a member located between the rods and having trunnion portions adapted to fit into said holes, a fulcrum block located between the rods and having a screw connected to it, a nut rotatably secured in said member, said nut being threaded onto said screw and being adapted when rotated to cause said screw to move axially relative to said member, a brake lever, a securing member pivotally connecting said lever to said fulcrum block, said securing member extending through said slots in the tension rods, and stop means associated with the securing member and adapted to engage a portion of the tension rods to prevent further movement of the screw when the nut has been rotated to the point where it reaches the end of the threads on the screw.

2. In a brake rigging, the combination of a pair of tension rods each of which has an elongated slot and a hole formed therein adjacent one end thereof, a member located between the rods and having trunnion portions adapted to fit into said holes, a fulcrum block located between the rods and having a screw connected to it, a nut rotatably secured in said member, said nut being in threaded engagement with said screw and being adapted when rotated to cause said screw to move axially relative to the member, a brake lever, a bolt pivotally connecting said lever to said member, said bolt extending through the slots in the tension rods, and stop means associated with said bolt and adapted to engage an end of said slots to prevent further movement of the screw when the nut has been rotated to the point where it reaches the end of the threads on the screw.

3. In a brake rigging, the combination of a pair of tension rods each of which has an elongated slot and a hole formed therein adjacent one end thereof, a member located between the rods and having trunnion portions adapted to fit into said holes, a fulcrum block located between the rods and having a screw connected to it, a nut rotatably secured in said member, said nut being in threaded engagement with said screw and being adapted when rotated to cause said screw to be moved axially relative to the member, a brake lever, a bolt pivotally connecting the brake lever to the fulcrum block, said bolt extending through said slots in the tension rods and through plates held against the outer face of each of the tension rods, said plates having stop portions located in the slots and slidable therein, the stop portions being adapted to engage one end of the slots to prevent further movement of the screw when the nut has been rotated to the point where it reaches the end of the threads on the screw.

4. In a brake slack adjuster, the combination of a brake lever, a pair of tension rods each of which has an elongated slot and a pair of holes formed therein adjacent one end thereof, a member located between the rods and having trunnion portions adapted to be placed in the holes nearest the ends of the rods when the brake rigging is first assembled, a fulcrum block located between the rods and having a screw connected to it, a nut rotatably secured in said member, said nut being in threaded engagement with said screw and being adapted when rotated to cause said screw to be moved axially relative to the member, a bolt pivotally connecting the brake lever to the fulcrum block, said bolt extending through said slots and through plates held against the outer faces of each of the tension rods by said bolt, each of said plates having a stop portion formed on it, said stop portions being located in said slots and slidable therein when the bolt is moved by the screw and fulcrum block, the plates being reversible so that the stop portions may be placed in the slots in either of two positions, said stop portions being placed in one of the positions when the trunnion portions are located in the end hole in each of the tension rods and when in that position being adapted to engage one end of the slots to prevent further movement of the screw when the nut has been rotated to the position where it reaches the end of the threads of the screw, and being placed in the opposite position in the slots when the trunnion portions are located in the other hole in each of the tension rods, and when in said last named position not being capable of engaging said one end of the slots and therefore being ineffective to limit movement of said screw.

5. In a brake slack adjuster, the combination of a brake lever, a pair of tension rods each of which has an elongated slot and a pair of holes formed therein adjacent one end thereof, a member located between the rods and having trunnion portions adapted to be placed in the holes nearest the ends of the rods when the brakes are originally assembled, a fulcrum block located between the rods and having a screw connected to it, a nut rotatably secured in said member, said nut being in threaded engagement with said screw and being adapted when rotated to cause said screw to move axially relative to said member, a securing member pivotally connecting said brake lever to the fulcrum block, said securing member extending through said slots in the tension rods, and stop means associated with the securing member, said stop means being slidably supported in the slots and being reversible so that they may be placed in either of two positions therein, said stop means being placed in one of the positions when the trunnion portions are located in the end hole in each of the tension rods and when in that position being adapted to engage one end of the slots to prevent further movement of the screw when the nut has been rotated to the position where it reaches the end of the threads of the screw, and being placed in the opposite position in the slots when the trunnion portions are located in the other hole in each of the tension rods, in which latter position the stop means does not engage said one end of the slots and therefore does not limit movement of the screw.

6. In a brake slack adjuster, the combination of a brake lever, a pair of tension rods each of which has an elongated slot and a pair of holes formed therein adjacent one end thereof, a member located between the rods and having trunnion portions adapted to be placed in the holes nearest the end of the rods when the brakes are originally assembled, a fulcrum block located between the rods and having a screw connected to it, a nut rotatably secured in said member, said nut being in threaded engagement with the screw and being adapted when rotated to cause the screw to be moved axially with respect to the member, a bolt pivotally connecting said brake lever to the fulcrum block, said bolt extending through said slots in the tension rods and through plates held against the outer faces of the rods by the bolt, said plates having stop portions formed therein and being reversible so that the stop portions may be assembled in either an effective or an ineffective position, said stop portions being placed in effective position when the trunnion portions are located in the end hole in each of the tension rods, in which position they engage one end of the slots to prevent further movement of the screw when the nut is rotated to the point where it reaches the end of the threads on the screw, said plates being reversed to place the stop portions in ineffective position when the trunnion portions are located in the other holes in the tension rods.

MARTIN P. BLOMBERG.